US010711479B2

(12) United States Patent
Kaufman et al.

(10) Patent No.: US 10,711,479 B2
(45) Date of Patent: Jul. 14, 2020

(54) AIRFOIL AS WIND MITIGATION SYSTEM FOR SECURING BUILDING ROOFTOPS EXPOSED TO ELEVATED WINDS

(71) Applicants: Sara Kaufman, Cooper City, FL (US); Nadine Leonard, Cooper City, FL (US)

(72) Inventors: Sara Kaufman, Cooper City, FL (US); Nadine Leonard, Cooper City, FL (US)

( * ) Notice: Subject to any disclaimer, the term of this patent is extended or adjusted under 35 U.S.C. 154(b) by 0 days.

(21) Appl. No.: 16/262,293

(22) Filed: Jan. 30, 2019

(65) Prior Publication Data

US 2019/0234095 A1   Aug. 1, 2019

Related U.S. Application Data

(60) Provisional application No. 62/624,110, filed on Jan. 30, 2018.

(51) Int. Cl.
*E04H 9/14*   (2006.01)
*E04D 13/00*   (2006.01)

(52) U.S. Cl.
CPC ............. *E04H 9/14* (2013.01); *E04D 13/00* (2013.01)

(58) Field of Classification Search
CPC ................................. E04H 9/14; E04D 13/00
See application file for complete search history.

(56) References Cited

U.S. PATENT DOCUMENTS

| | | | | |
|---|---|---|---|---|
| 2,270,537 A * | 1/1942 | Ludington | ................ | E04H 9/14 52/173.1 |
| 2,270,538 A * | 1/1942 | Ludington | ................ | E04H 9/14 52/15 |
| 3,828,498 A * | 8/1974 | Jones | .................. | E04B 1/34347 52/173.1 |
| 4,005,557 A * | 2/1977 | Kramer | ................... | E04D 13/00 52/173.1 |
| 5,918,423 A * | 7/1999 | Ponder | .................... | E04D 13/00 52/173.1 |
| 6,601,348 B2 * | 8/2003 | Banks | ..................... | E04D 13/00 244/199.1 |
| 7,765,747 B1 * | 8/2010 | Smalley, III | ........... | B61D 17/02 52/84 |
| 2010/0024340 A1 * | 2/2010 | Claywell | ................... | E04H 9/14 52/578 |

* cited by examiner

*Primary Examiner* — Babajide A Demuren
(74) *Attorney, Agent, or Firm* — Allen F. Bennett; Bennett Intellectual Property (57) ABSTRACT

A wind mitigation device includes one or more posts extending upward from the roof of a building and having a cross-sectional shape of an airfoil. The airfoil posts may be aligned in the same direction, or all facing outward along the periphery. The airfoil posts may be of the same or differing sizes. The amount of force holding a roof down generated by a plurality of airfoil posts is correlated with the total surface area of the entire airfoil post system.

7 Claims, 9 Drawing Sheets

AIRFOIL AS WIND MITIGATION SYSTEM FOR SECURING BUILDING ROOFTOPS EXPOSED TO ELEVATED WINDS

CROSS-REFERENCE TO RELATED APPLICATIONS

This application claims priority to U.S. Provisional Application Ser. No. 62/624,110 filed on Jan. 30, 2018, the contents of which are hereby incorporated by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable

INCORPORATION-BY-REFERENCE OF THE MATERIAL SUBMITTED ON A COMPACT DISC

Not Applicable.

COPYRIGHT NOTICE

Not Applicable

BACKGROUND OF THE INVENTION

Field of the Invention

The present invention relates to devices and methods for protecting the integrity of residential and commercial structures in high wind conditions such as hurricanes. More particularly, the invention relates to upright airfoils affixed to buildings to create a downward force on a roof in high wind.

Description of the Related Art

Hurricanes are very large and extremely powerful storms that move around a central point called an eye. They can occur all over the world, although they can go by different names in different regions. In the northern Atlantic ocean they move counterclockwise, while in the southern Atlantic Ocean they move clockwise. Hurricanes cause a lot of damage. They can destroy homes, unroot trees, and even cause major damage to cars, people, and animals.

Hurricanes can be classified into five different groups. A category one hurricane has winds moving from 92 kilometers per hour to 152 kilometers per hour. A category two hurricane has winds moving from 153 kilometers per hour to 177 kilometers per hour. A category three hurricane has winds moving from 178 kilometers per hour to 207 kilometers per hour. Category three and above hurricanes are considered severe. Category four hurricanes have winds moving from 208 kilometers per hour to 251 kilometers per hour. Category five hurricanes have winds moving 252 kilometers per hour or above. If the wind from hurricanes were put into turbines, one turbine alone could power up to 500 houses. These storms can be measured using the Saffir-Simpson Scale. Approximately forty one hurricanes have been analyzed with the scale since 1960. The scale gives each hurricane a number from 0 to 100 based on six components.

The hurricane that cost the most in damages was Hurricane Katrina, which occurred in 2005. It cost $160 billion in damages. Most hurricanes hit the U.S. in the South, both along the Gulf and Atlantic coasts. From 1851 to 2014, 290 hurricanes have hit U.S. territory. 117 of them were category one hurricanes.

The average house is very vulnerable during a strong hurricane, especially its roof. The wind force is a function of the wind pressure and the surface area. The pressure increases by the square of the velocity of the wind. In a hurricane, a slightly higher wind means a lot more force. Certain house and roof types could improve the functionality of the house during a hurricane. For example, very large overhangs on a roof could cause the entire roof to fly off. If the roof of a house or the house itself is slanted in the direction of the wind, then the house can have more stability. Circular roofs cause the wind to simply curve around the house. Holes in a wall allow the wind to pass through, and make the amount of wind passing through lessen, whilst acting like a regular wall. Raised houses let a lot of wind go under, not up against the house, and they allow water to accumulate under the house, preventing floods. Frames make a house stronger. Some houses do not follow a satisfactory building code.

Most damage in roofs after a hurricane is caused by suction. Sharp sides on a roof tend to increase the damage because when wind hits a bulky body, spiraling wind known as vortices, form. Several with mitigation devices have been proposed.

In view of the foregoing, it is desirable to provide devices and methods for preventing a roof of a building from lifting off a structure when exposed to high winds, such as for example hurricane strength winds.

BRIEF SUMMARY OF THE INVENTION

Disclosed is a system of devices and methods for preventing high winds from removing the roof of a structure.

In one embodiment, the systems, methods and devices of the invention include one or more wind airfoil posts affixed to the roof of a building. The wind airfoil posts may have an airfoil-shaped cross-section and be affixed to the periphery of the roof perpendicular to the horizontal plane. The wind airfoil posts may be evenly distributed along the periphery and aligned in the same direction. In some embodiments, several shorter airfoil posts are used, while in other embodiments, fewer, shorter airfoil posts are used.

It is therefore an object of the present invention to provide a system of devices such as airfoil posts arranged on the roof of a building to prevent the roof from becoming detached when exposed to high winds.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Disclosed systems and methods for preventing the roof of the building becoming detached from a structure to which it is attached. One or more upright airfoil posts are attached to a building along the periphery of the roof. The upright airfoil posts have a cross-sectional shape of an airfoil. Without being bound by theory, it is believed that the upright posts channel wind passing over a building such that it deflects the vortices that create pressure differentials, thus counteracting and deflecting and/or mitigating the upward forces of the wind.

Figure 1:
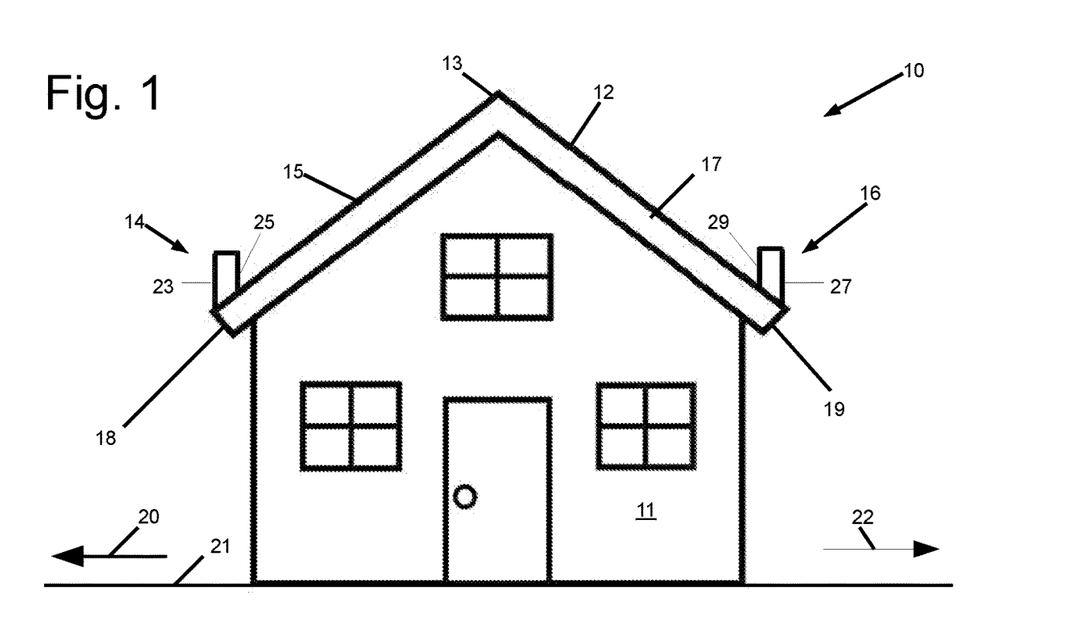
FIG. 1 is a front elevation view of a house having a wind mitigation system in accordance with the principles of the invention.
Figure 2:
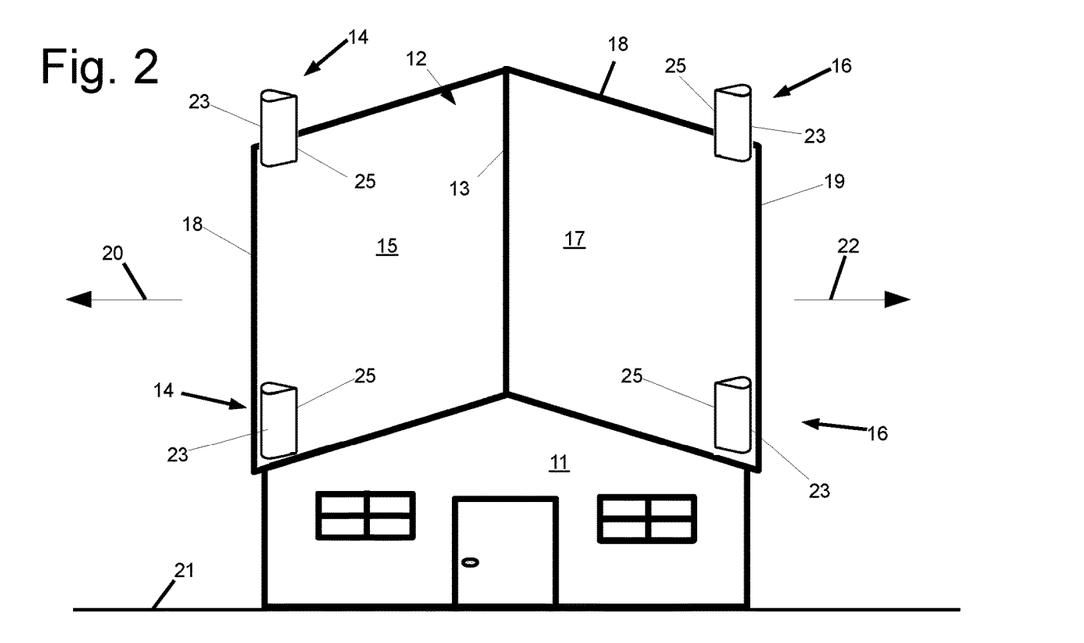
FIG. 2 is a perspective view of a wind mitigation system in accordance with the principles of the invention.

FIGS. 1 and 2 show one embodiment of a wind mitigation system 10 for preventing a roof from becoming detached from a house 11 in accordance with principles of the invention. The house 11 has a single gable roof 12. The roof 12 as a central ridge 13 and two opposing sloped sides 15 and 17. In this embodiment, there are two pairs of airfoil posts 14 and 16. The first pair of airfoil posts 14 are located on the peripheral edge 18 of the sloped side 15. The second pair of airfoil posts 16 are located opposite to the first pair of airfoil posts 14, positioned along the periphery of average 19 of the sloped side 17. In this embodiment, the airfoil posts 14 and 16 are perpendicular to the ground 21, extending directly upward. Each of airfoil posts 14 and 16 have an airfoil shaped cross-section. The airfoil posts 14 are aligned parallel to each other along the peripheral edge 18 of the sloped side 15 and facing a first direction 20. That is, the airfoil posts 14 have leading edges 23 facing a direction 20 away from the center of the roof 12 and a trailing edge 25 facing the direction of the center of the roof 12, which in this embodiment is the central ridge 13. Similarly, the airfoil posts 16 are also aligned parallel to each other along the peripheral edge 19 of the sloped side 17, and opposite to the airfoil posts 14. The airfoil posts 16 have leading edges 27 facing a second direction 22, and trailing edges 29 facing the center of the roof 12. Without being bound by theory, the inventor believes that so long as the leading edges of the airfoil posts face away from the roof 12, wind flowing in any direction over the roof 12 will be partially directed in a manner that minimizes and/or mitigates upward forces on the roof 12. Additional airfoil posts may be added along the other peripheral edges of the roof 12.

Figure 3:
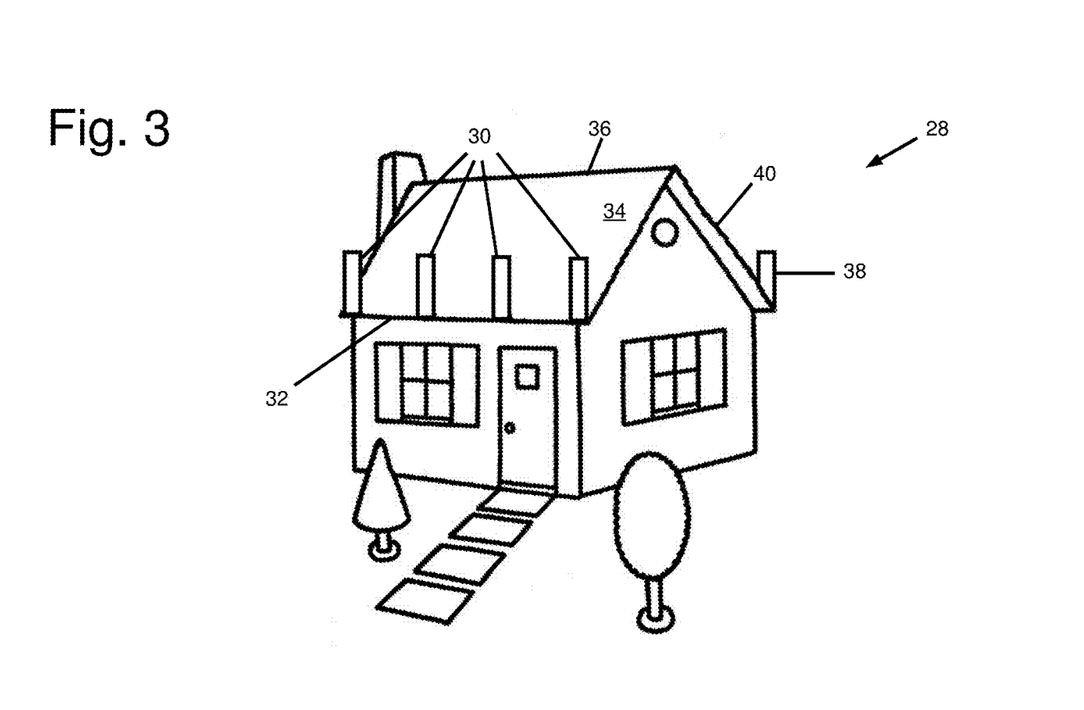
FIG. 3 is a perspective view of an alternative embodiment of a wind mitigation system in accordance with the principles of the invention.

FIG. 3 shows an alternative embodiment of a wind mitigation system 28 in accordance with the principles of the invention. In this embodiment, four upright airfoil posts 30 are arranged in a straight line along the peripheral edge 32 of a first side 34 of a gabled roof 36. Four opposing airfoil posts 38 are positioned along peripheral edge of a second side 40 of the gabled roof 36. In general, airfoil posts 30 and 38 may vary in height, number, and arrangement pattern on the roof.

Figure 4:
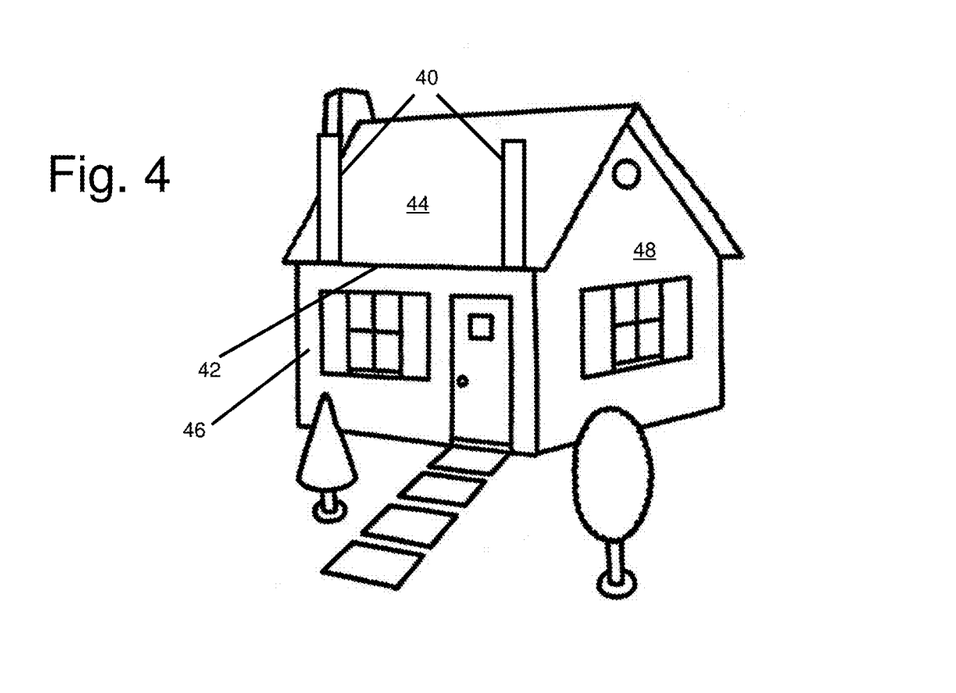
FIG. 4 is a perspective view of another alternative embodiment of a wind mitigation system in accordance with principles of the invention.

In another embodiment, shown in FIG. 4, two airfoil posts 40 are affixed perpendicular to the ground along the periphery 42 of a gabled roof 44 on one side 46 the house 48. Airfoil posts 40 are approximately twice as tall as the airfoil posts 30 and 38 shown in FIG. 3. As a result, even though fewer airfoil posts are used in the embodiment shown in FIG. 4, they also mitigate upward forces caused by high winds.

Figure 5:
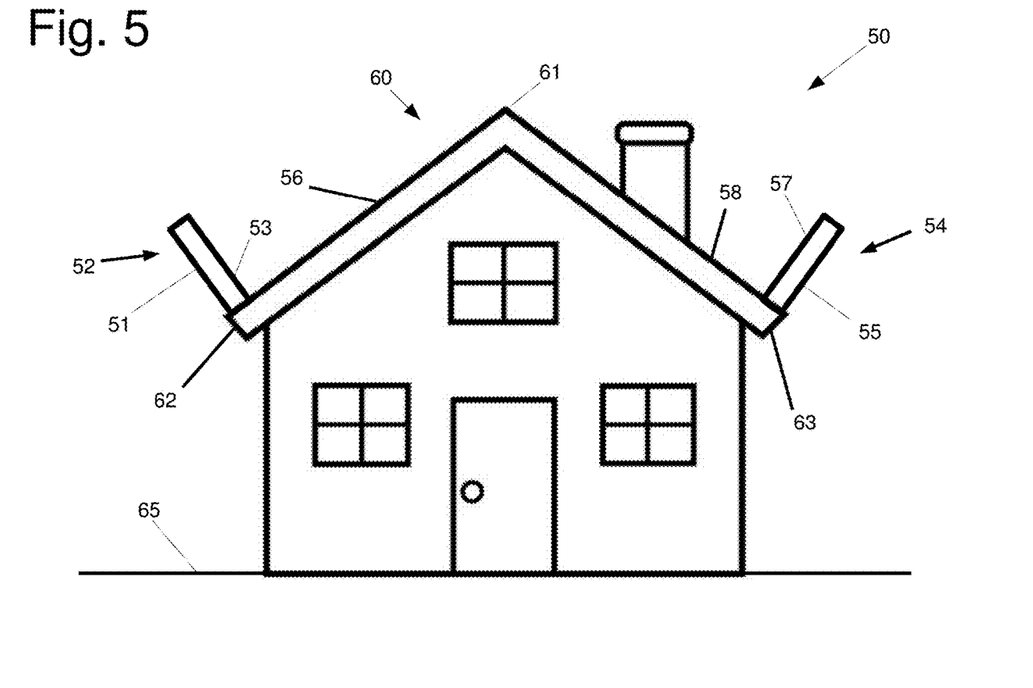
FIG. 5 is a front elevation view of another alternative embodiment of a wind mitigation system in accordance with principles of the invention.
Figure 6:
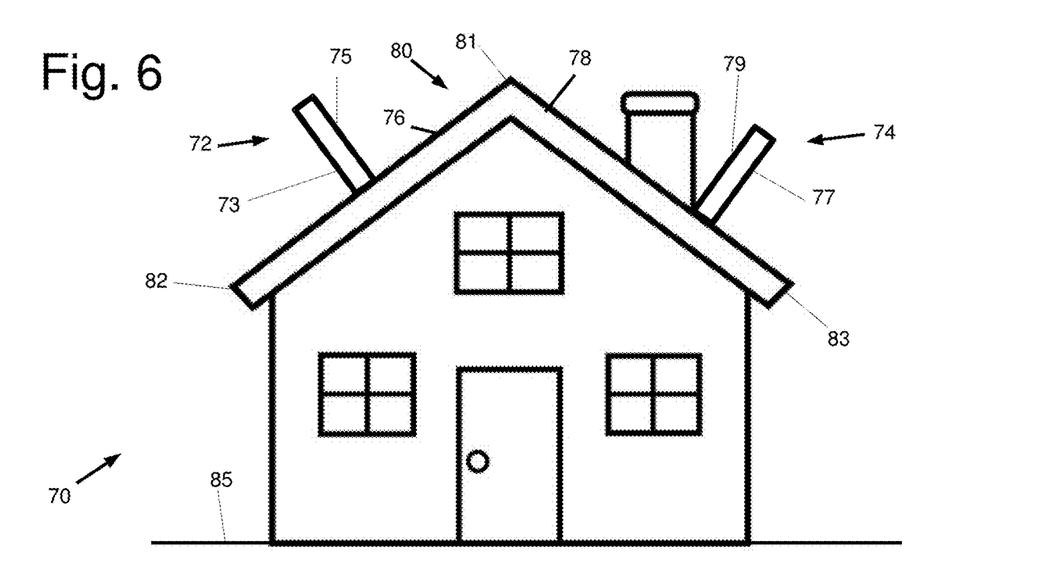
FIG. 6 is a front elevation view of another alternative embodiment of a wind mitigation system in accordance with principles of the invention.
Figure 7:
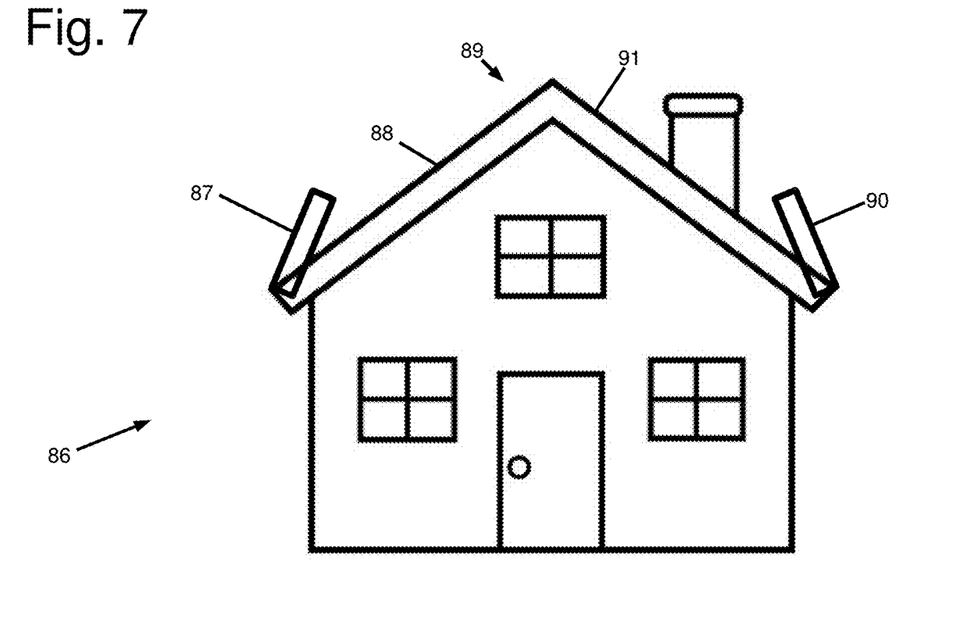
FIG. 7 is a front elevation view of another alternative embodiment of a wind mitigation system in accordance with the principles of the invention.

In general, airfoil posts are preferably located along the peripheral edge of a roof perpendicular to the ground and having an airfoil cross-section. Preferably the airfoil posts are positioned such that the leading edge faces away from the roof and the trailing edge faces toward the roof. However, other configurations may be used. FIGS. 5, 6 and 7 illustrate alternative embodiments.

FIG. 5 shows an alternative embodiment of a wind mitigation system 50 in accordance with the principles of the invention. Airfoil posts 52 and 54 are located on opposing peripheral edges 62 and 63 of opposing sides 56 and 58, respectively, of a gabled roof 60 having a central ridge 61. In this embodiment, the airfoil posts 52 and 54 are perpendicular to the sides 56 and 58, respectively, of the gabled roof 60, and not perpendicular to the ground 65. The airfoil posts 52 have leading edges 51 facing away from the roof 60 and trailing edges 53 facing toward the roof 60. Opposing airfoil posts 54 have leading edges 55 facing away from the roof 60 and trailing edges 57 facing toward the roof 60.

FIG. 6 shows another alternative embodiment of a wind mitigation system 70 having two rows of airfoil posts 72 and 74 on opposing sides 76 and 78, respectively, of a gabled roof 80 having a central ridge 81. In this embodiment, the airfoil posts 72 and 74 are perpendicular to their respective opposing sides 76 and 78 of the gabled roof 80, and not perpendicular to the ground 85. Airfoil posts 72 are located approximately midway between the central ridge 81 and the peripheral edge 82 of the sloped side 76. Similarly, airfoil posts 74 are located in the middle region of the sloped side 78 between the central ridge 81 and the peripheral edge 83. The airfoil posts 72 and 74 of FIG. 6 are not arranged symmetrically but rather are placed in different locations on their respective opposing side 76 and 78. Airfoil posts 72 have leading edges 73 facing a way from the center of the roof 80, indicated by the central ridge 81. Airfoil posts 72 have trailing edges 75 facing toward the center of the roof 80. Airfoil posts 74 have leading edges 77 facing away from the center of the roof 80 and trailing edges 79 facing toward the center of the roof 80.

FIG. 7 shows another alternative embodiment of a wind mitigation system 86 in accordance with the principles of the invention. In this embodiment, airfoil posts 87 form an acute angle with a first sloped side 88 of a gabled roof 89. The airfoil posts 87 lean toward the center of the roof 89. Similarly, the airfoil posts 90 form an acute angle with a second sloped side 91 of the gabled roof 89, and lean toward the center of the roof 89.

Figure 8:
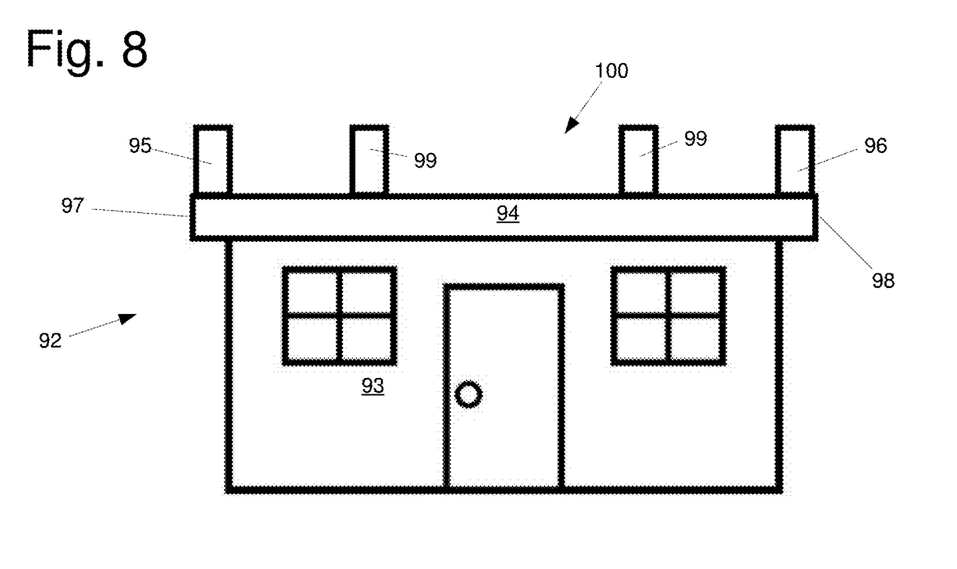
FIG. 8 is a front elevation view of another alternative embodiment of a wind mitigation system in accordance with the principles of the invention.

FIG. 8 shows another alternative embodiment of a wind mitigation system 92 Incorporated into a house 93 having a flat roof 94. Two sets of opposing airfoil posts 95 and 96 are positioned along opposite peripheral edges 97 and 98, respectively. Additional airfoil posts 99 are located in the central region 100 of the roof 94. As with other embodiments, the airfoil posts 95, 96 and 99 have leading edges facing away from the center of the roof and trailing edges facing toward the center of the roof.

As shown in the Figures, airfoil posts may be arranged in a variety of configurations, may be positioned at different locations on a roof, and may having different heights and extending at different angles relative to the roof and/or ground. In addition, the different arrangements shown may be mixed and combined.

Without being bound by theory, the inventor believes that the amount of downward force holding down a roof generated by airfoil posts depends upon the total surface area of the sides of all the posts. Therefore, a single airfoil post 40 shown in FIG. 4 may provide approximately the same amount of wind protection as airfoil posts 30 of FIG. 3. However, it may be desirable to use a plurality of shorter airfoil posts rather than a very few large airfoil posts in order to better distribute the force applied by wind channeled by the airfoil posts.

Figure 9:
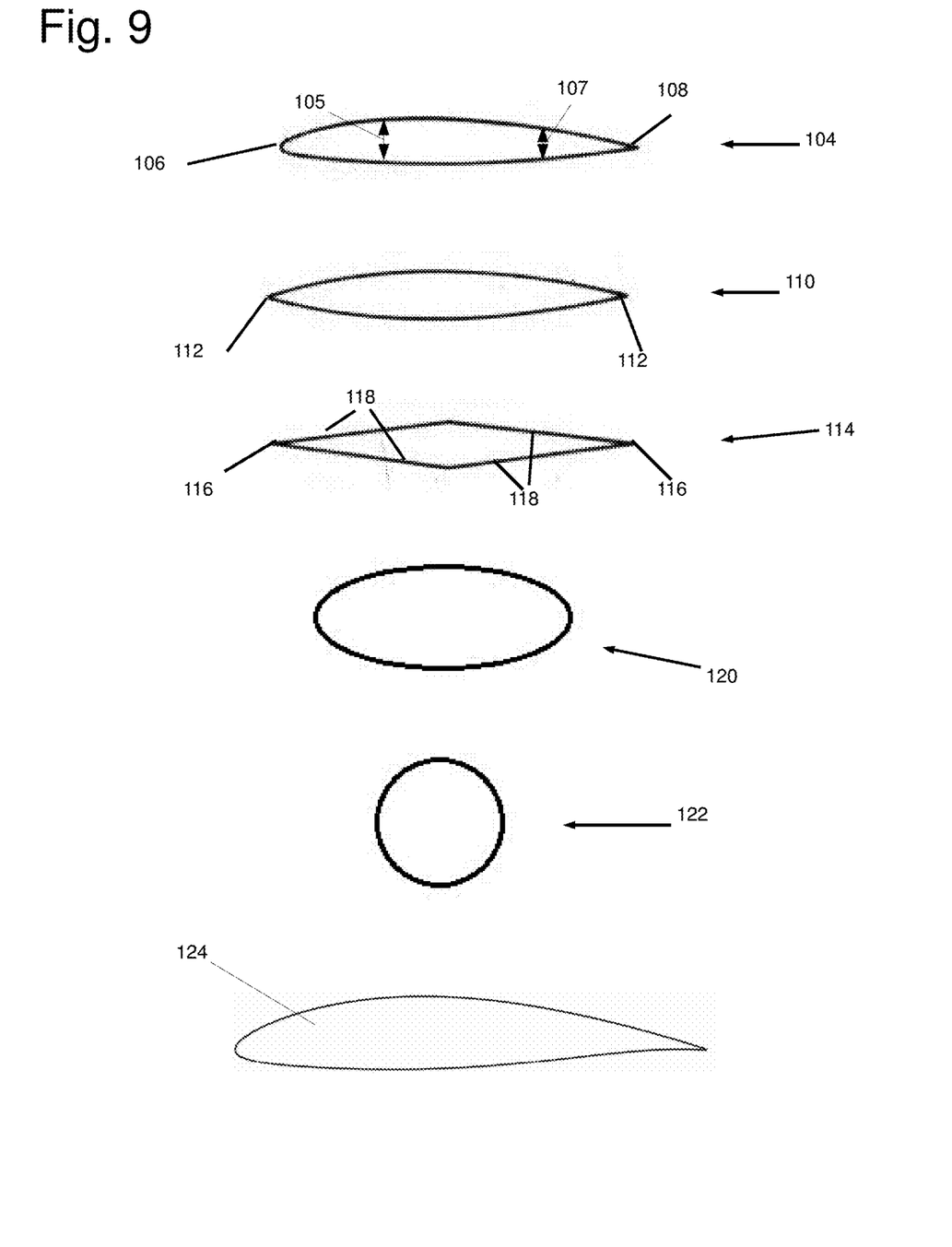
FIG. 9 is a cross-sectional view of different wind airfoil posts in accordance with principles of the invention.

FIG. 9 shows several different cross-section geometries suitable for the airfoil posts in accordance with principles of the invention. Airfoil post 104 has a typical, symmetric airfoil shape having a blunt leading edge 106 and a pointed trailing edge 108. Those skilled in the art will appreciate that airfoil post 104 has a typical laminar flow airfoil geometry with a symmetrical camber resulting in a width 105 near the leading edge 106 greater than the width 107 near the pointed trailing edge 108. Airfoil post 110 has a symmetric airfoil shape having two pointed ends 112, known in the art as a circular arc type airfoil. Airfoil post 114 is pointed at both ends 116 and has flat sides 118. Airfoil post 120 has an ellipsoidal shape and airfoil post 122 has a circular shape. Airfoil posts 120 and 122 do not have a typical airfoil shape. In general, airfoil posts having a cross-sectional shape of an airfoil are most advantageous. Finally, airfoil post 124 has a typical subsonic, non-symmetric airfoil is also suitable for use with the present invention. When non-symmetric airfoil posts 124 or used it may be desirable to alternate the orientation of the posts are used on a roof.

A wind tunnel was used to test three different types of wind mitigation devices on the edge of a gabled roof (a barrier, a rounded shape, and an airfoil shape) against simulated hurricane winds to see which device reduced the uplift forces on the roof the most. A common gabled roof was used as a control. The independent variable was the shape of the mitigation device on the leading edge of the roof, the dependent variable was how much time it took for the roof to come off the house, and the controlled variables were wind speed, weight of the house and roof being tested, the weight of the mitigation device, the angle the wind hits the roof (angle of incidence), and the orientation of the house in the tunnel.

First, a wind tunnel was built using PVC pipe, acrylic and a leaf blower. Wind mitigation devices were added to gabled birdhouse roofs. A roofless birdhouse was fixed to a section on the wind tunnel and the roofs were placed on top and tested one by one, with the leaf blower turned on to full power. The roof mitigation device having an airfoil shape with stood high winds for the longest amount of time.

The following steps were used to measure the efficacy of different airfoil post designs:

1. Mark the location of the screws in test section of wind tunnel and drill holes in bottom of one birdhouse so the house fits onto the testbed, oriented with the side of the house facing the wind.
2. Using the rubber mallet and the screwdriver, gently tap the trim off the roofs of all four birdhouses.
3. Save the trim for adding weight to the roofs later if necessary.
4. Using the rubber mallet, gently tap off the roofs from each of the four birdhouses.
5. Keep the birdhouse with the holes drilled in the bottom and discard the rest.
6. Remove the perch from the front of the birdhouse.
7. Trace the shape of the front of the birdhouse on the basswood sheet.
8. Cut the shape of the front and glue over the existing front to cover the bird hole.
9. Set the house aside and let the glue dry.
10. Cut the dowel in six pieces: two measuring 6.0 cm, two measuring 6.5 cm long and two measuring 5.5 cm long.
11. Use the sandpaper to make an indentation approximating a right angle along the length of each piece.
12. Glue the dowels to the edges of one roof.
13. Cut the balsa stick into two sets of six pieces: two measuring 6.5 cm, two measuring 5.5 cm long, and two measuring 6.0 cm.
14. Glue the pieces of one set of cut balsa stick onto the edges of a second roof.
15. With the other set of balsa stick pieces, use sandpaper to shape an airfoil along the length of both pieces.
16. Glue the airfoils to the edges of the third roof, so the airfoils stick up and are at a ninety degree angle to the wind.
17. When all of the glue has dried, weigh the four roofs using the precision scale.
18. Sand the three heaviest ones until they all weigh within 0.01 gram of the lightest one.
19. Attach the roofless house to the metal plate using the two nuts.
20. Place the control roof (with no mitigation devices) on the house.
21. Place acrylic window over test section.
22. Gradually turn on the wind tunnel, slowly increasing the wind speed until the roof blows off.
23. Mark the spot on the leaf blower speed control knob.
24. Turn the leaf blower off.
25. Remove the acrylic window.
26. Turn on the leaf blower to the marked spot and use the anemometer to measure the wind speed in meters per second.
27. Record the results.
28. Put the control roof back on the birdhouse and place the acrylic cover back on the wind tunnel.
29. Start the stopwatch and turn the leaf blower on to the marked spot.
30. Stop the stopwatch when the roof blows off.
31. Record the results.
32. Remove the acrylic cover.
33. Remove the control roof and replace it with another roof.
34. Repeat steps 28-34 for each roof, until all four roofs have been tested and all results have been recorded.

Figure 10:
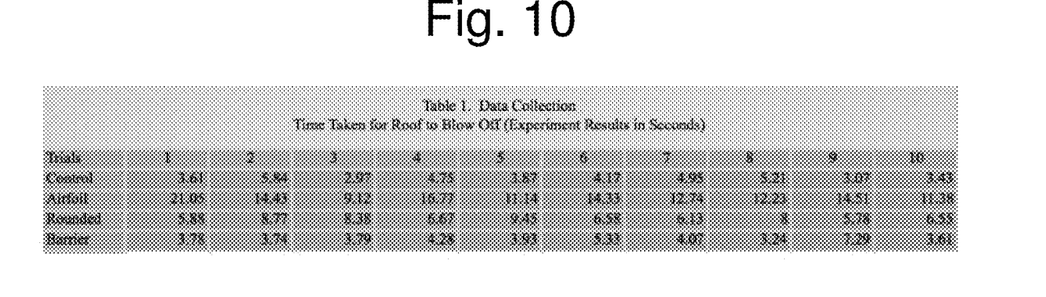
FIG. 10 is a table showing the results of wind mitigation by airfoil posts having different configurations in accordance with principles of the invention.
Figure 11:
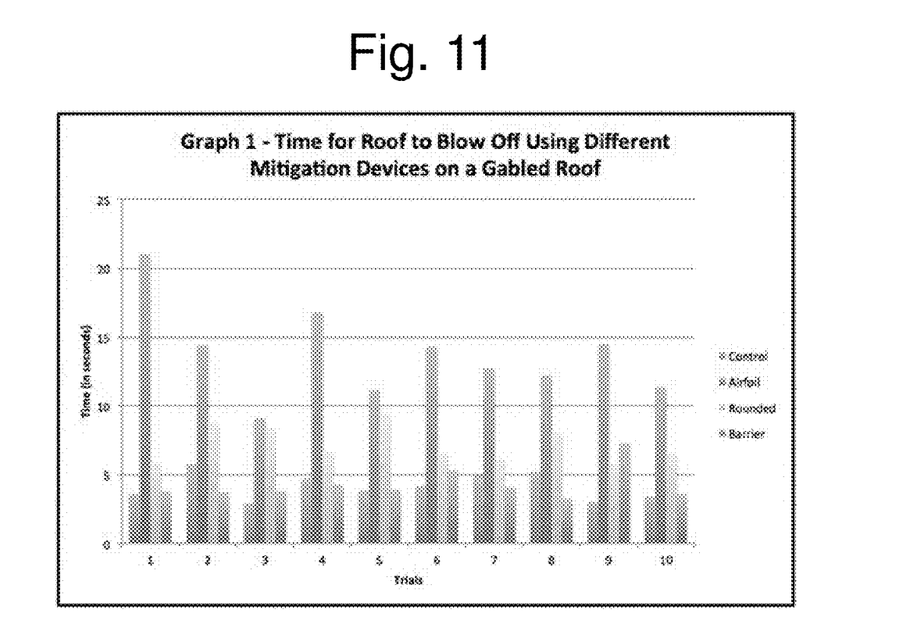
FIG. 11 is a graph showing the results of wind mitigation by airfoil posts having different configurations in accordance with principles of the invention.
Figure 12:
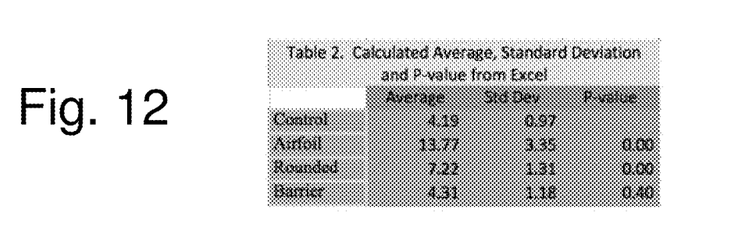
FIG. 12 provides statistical data regarding the results of the tests shown in FIG. 10 and FIG. 11 in accordance with principles of the invention.
Figure 13:
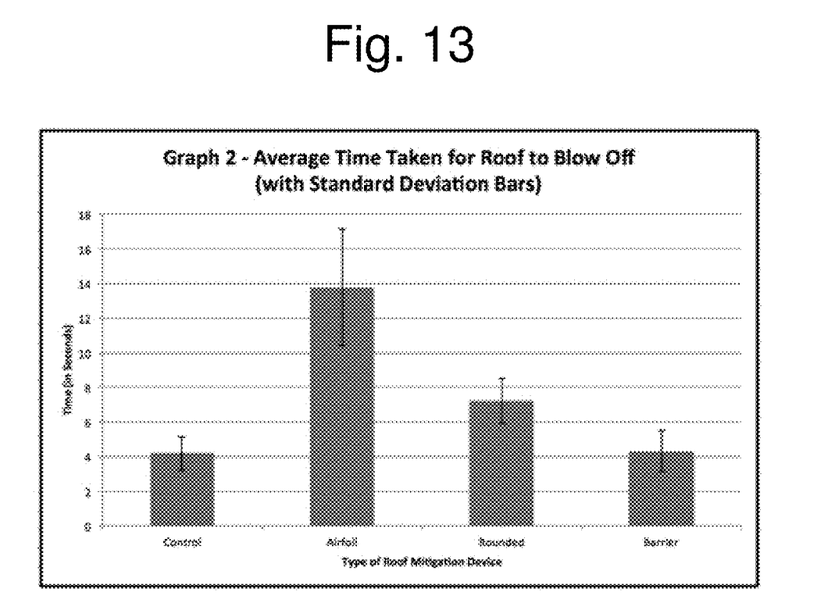
FIG. 13 is a graph of the average time taken for a roof to blow off according to the type of airfoil post used in accordance with principles of the invention.
Figure 14:
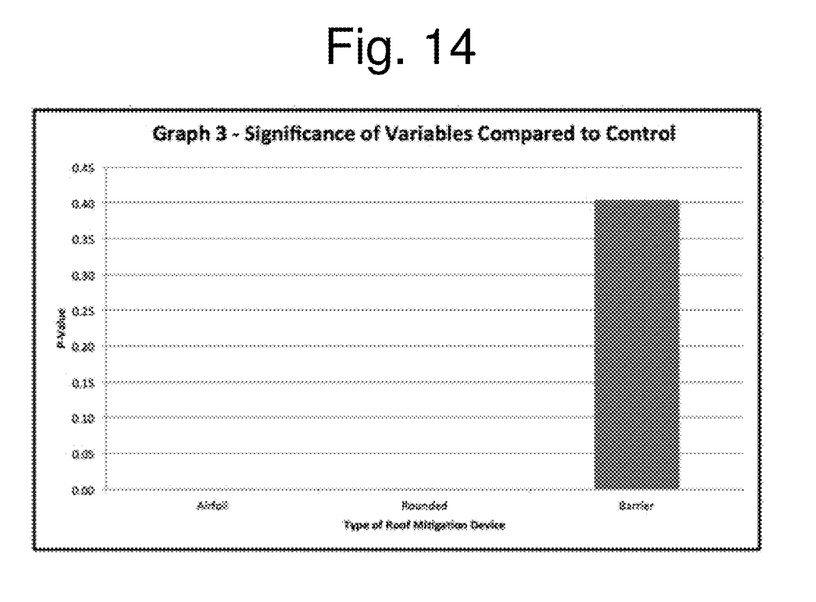
FIG. 14 is another graph of statistics regarding the results of the tests shown in FIG. 10 and FIG. 11 in accordance with principles of the invention.

Three roof mitigation systems were tested against uplift forces on a gabled roof. A rounded edge airfoil post was chosen because rounded (domed) roofs were found to survive hurricanes. A flat edge barrier airfoil post was used because it resembles a spoiler on airplanes, which disrupt the lift. Lastly, an airfoil airfoil post was chosen because it resembles a winglet on an airplane. Winglets redirect vortices on airplane wings, thus reducing drag and providing fuel savings to airlines. FIGS. 10 and 11 show the raw data from 10 iterations of the test method described above. FIG. 12 provides statistical data measuring the accuracy of the testing method and shows the average time periods for each airfoil post type, including standard deviations.

The airfoil post that made the roof take the longest to blow off was the airfoil, therefore supporting the hypothesis of this experiment. The average time taken for the roof with the airfoil airfoil post to blow off was 13.77 seconds, with a range of 9.12 seconds to 21.05 seconds. The average time of the roof having airfoil posts was over 3 times as long as the control roof average time. The average time for the rounded edge airfoil post equipped roof to blow off was 7.22 seconds. The rounded edge's range was 5.78 seconds to 9.45 seconds. It took the second longest time to blow off with an average of almost half of the airfoil post average. It took an average of 3.03 seconds longer to blow off than the control. The average time for the roof having a barrier airfoil post to blow off was only 4.31 seconds, just 0.22 seconds longer than the control. The barrier's range was 1.18 seconds to 4.31 seconds. The average time for the control to blow off was 4.19 seconds. The control's range was 2.97 seconds to 5.84 seconds.

The results and statistical calculations show that the barrier mitigation device is not statistically significant from the control because it did not disprove the null hypothesis, as shown in FIG. 21. The rounded edge and airfoil are highly statistically significant.

Figure 15:
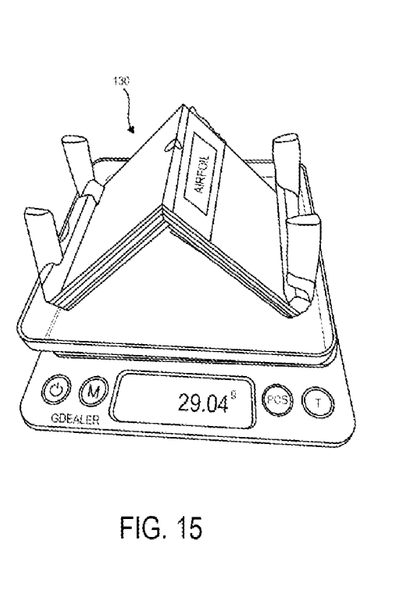
FIG. 15 is a perspective view of another embodiment of a roof having four tall airfoil posts in accordance with principles of the invention.
Figure 16:
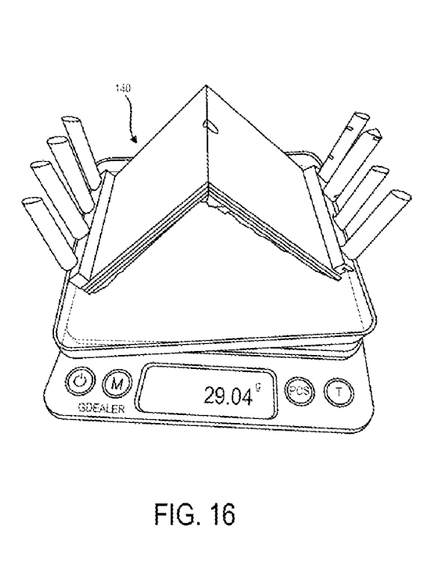
FIG. 16 is a perspective view of another embodiment of a roof having eight tall airfoil posts in accordance with principles of the invention.
Figure 17:
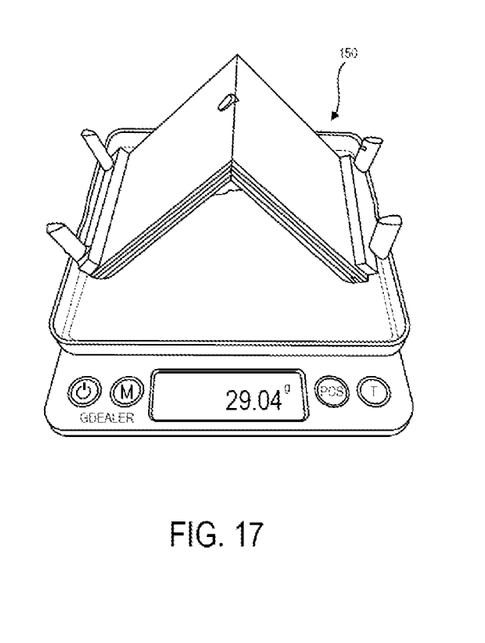
FIG. 17 is a perspective view of another embodiment of a roof having four short airfoil posts in accordance with principles of the invention.
Figure 18:
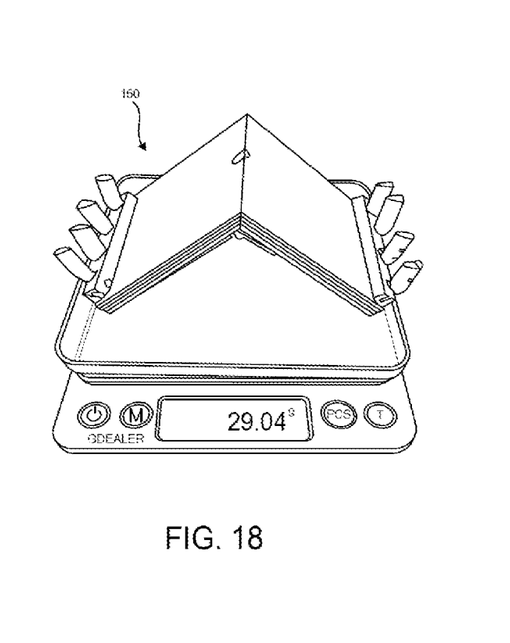
FIG. 18 is a perspective view of another embodiment of a roof having eight short airfoil posts in accordance with principles of the invention.
Figure 19:
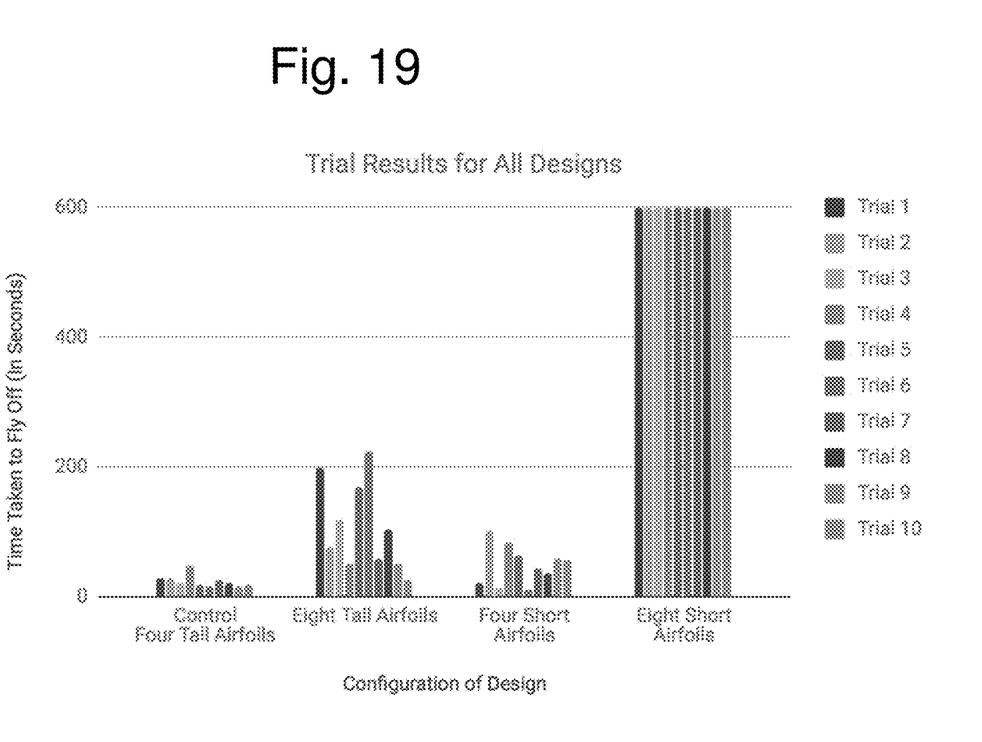
FIG. 19 is a chart showing the results of testing the embodiment shown in FIGS. 15-18 in accordance with principles of the invention.

Further testing was performed to determine how the number and size of airfoil posts impacts the efficacy of different embodiments of the invention. Four different embodiments were compared: a roof with four tall airfoil posts 130 as shown in FIG. 15, a roof with eight tall airfoil posts 140 as shown in FIG. 16, a roof with for short airfoil posts 150 as shown in FIG. 17 and a roof with eight short airfoil posts 160 as shown in FIG. 18. These embodiments were placed in a wind tunnel and the time the roof lasted on a model house was measured. The results are shown in the following table and in FIG. 19:

TABLE 1

| | Test Results (In Seconds) | | | | | | | | | |
|---|---|---|---|---|---|---|---|---|---|---|
| | Trial 1 | Trial 2 | Trial 3 | Trial 4 | Trial 5 | Trial 6 | Trial 7 | Trial 8 | Trial 9 | Trial 10 |
| Control Four Tall Airfoils | 28.97 | 28.96 | 22.3 | 49.4 | 17.73 | 15.52 | 26.53 | 21.16 | 17.36 | 18.69 |
| Eight Tall Airfoils | 200.07 | 75.33 | 120.04 | 50.08 | 170.1 | 223.09 | 57.59 | 104.07 | 50.38 | 25.16 |

TABLE 1-continued

Test Results (In Seconds)

|  | Trial 1 | Trial 2 | Trial 3 | Trial 4 | Trial 5 | Trial 6 | Trial 7 | Trial 8 | Trial 9 | Trial 10 |
|---|---|---|---|---|---|---|---|---|---|---|
| Four Short Airfoils | 20.73 | 102.15 | 13.32 | 83.09 | 62.63 | 10.24 | 43.6 | 35.76 | 59.25 | 55.32 |
| Eight Short Airfoils | 600 | 600 | 600 | 600 | 600 | 600 | 600 | 600 | 600 | 600 |

The average time for the control to fly off was 24.662 seconds, and it had a median of 21.73 seconds with no mode. The average time for the device with a total of eight tall airfoils to fly off was 107.591 seconds, and it had a median of 89.7 seconds with no mode. The average time for the device with a total of four short airfoils to fly off was 48.609 seconds, and it had a median of 49.46 seconds with no mode. The average time for the device with a total of eight short airfoils to fly off was 600 seconds, and it had a median of 600 seconds with a mode of 600 seconds.

The results show that the embodiment 160 having eight short airfoil posts, with four arranged along each of the two peripheral edges of the two sloped sides of a gabled roof provide the best protection from high winds. The experiment was terminated upon reaching 600 seconds with the roof 160 never being blown off.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated. Those skilled in the art will appreciate that the conception, upon which this disclosure is based, may readily be utilized as a basis for the designing of other structures, methods and systems for practicing the present invention. It is important, therefore, that the claims be regarded as including such equivalent constructions insofar as they do not depart from the spirit and scope of the present invention.

The invention claimed is:

1. A wind mitigation system comprising:
at least one upright airfoil post having a length extending upward from a peripheral edge of a roof of a building and having a cross-sectional shape of an airfoil;
wherein the airfoil post has a blunt leading edge facing away from a center of a roof and a pointed trailing edge facing toward the center of the roof;
wherein the leading edge and the trailing edge both extend the entire length of the upright airfoil post; and,
wherein the leading edge and the trailing edge are both aligned parallel to a vertical axis of the upright airfoil post.

2. The wind mitigation system of claim 1 wherein the at least one upright airfoil post comprises a plurality of upright airfoil posts.

3. The wind mitigation system of claim 2 wherein the roof is flat and has a plurality of peripheral edges; and,
wherein the plurality of upright airfoil posts are arranged two or more of the edges.

4. The wind mitigation system of claim 2 wherein the roof has a central ridge, a first sloped side having a first peripheral edge and an opposing second sloped side having an opposing second peripheral edge, and the plurality of upright airfoil posts are arranged along the opposing peripheral edges of the sloped sides.

5. The wind mitigation system of claim 4 wherein the axes of the plurality of upright airfoil posts are aligned perpendicular to the earth.

6. The wind mitigation system of claim 5 wherein the plurality of upright airfoil posts comprise four airfoil posts arranged along the first peripheral edge and four airfoil posts arranged along the second peripheral edge.

7. The wind mitigation system of claim 4 wherein the axes of the plurality of upright airfoil posts are aligned perpendicular to a surface of the roof.

* * * * *